United States Patent
McDonald et al.

(10) Patent No.: US 10,125,429 B2
(45) Date of Patent: *Nov. 13, 2018

(54) ELECTRODES CONTAINING IRIDIUM NANOPARTICLES FOR THE ELECTROLYTIC PRODUCTION OF OXYGEN FROM WATER

(71) Applicant: Toyota Motor Engineering & Manufacturing North America, Inc., Erlanger, KY (US)

(72) Inventors: Kenneth J. McDonald, Oak Forest, IL (US); Michael Paul Rowe, Pinckney, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 151 days.

This patent is subject to a terminal disclaimer.

(21) Appl. No.: 15/191,003

(22) Filed: Jun. 23, 2016

(65) Prior Publication Data

US 2016/0298246 A1    Oct. 13, 2016

Related U.S. Application Data

(63) Continuation of application No. 14/328,635, filed on Jul. 10, 2014, now abandoned, which is a
(Continued)

(51) Int. Cl.
*B22F 9/16* (2006.01)
*C25B 11/04* (2006.01)
(Continued)

(52) U.S. Cl.
CPC ............ *C25B 11/0473* (2013.01); *B22F 9/04* (2013.01); *B22F 9/20* (2013.01); *B22F 9/24* (2013.01);
(Continued)

(58) Field of Classification Search
CPC .... B22F 9/04; B22F 9/20; B22F 9/24; H01M 4/0404; H01M 4/139; H01M 4/88
(Continued)

(56) References Cited

U.S. PATENT DOCUMENTS

| 4,448,856 A | 5/1984 | Zuckerbrod |
| 5,145,752 A | 9/1992 | Goldstein et al. |

(Continued)

FOREIGN PATENT DOCUMENTS

| JP | 2012-038697 A | 2/2012 |
| JP | 2013-073839 A | 4/2013 |

(Continued)

OTHER PUBLICATIONS

Gambardella et al., "Electron Transfer Dynamics of Iridium Oxide Nanoparticles Attached to Electrodes by Self-Assembled Monolayers", Journal of the American Chemical Society, 2012, pp. 5774-5777, vol. 134, No. 13.
(Continued)

*Primary Examiner* — Brian K Talbot
(74) *Attorney, Agent, or Firm* — Christopher G. Darrow; Darrow Mustafa PC

(57) ABSTRACT

Electrodes employing as active material iridium nanoparticles synthesized by a novel route are provided. The nanoparticle synthesis is facile and reproducible, and provides iridium nanoparticles of very small dimension and high purity for a wide range of metals. The electrodes utilizing these nanoparticles have excellent efficiency catalyzing the electrolytic production of oxygen from water.

9 Claims, 2 Drawing Sheets

Related U.S. Application Data continuation-in-part of application No. 14/046,120, filed on Oct. 4, 2013, now Pat. No. 9,296,043, and a continuation-in-part of application No. 14/219,836, filed on Mar. 19, 2014, now Pat. No. 9,761,904.

(51) Int. Cl.

| | | |
|---|---|---|
| *B22F 9/24* | (2006.01) | |
| *C25B 1/04* | (2006.01) | |
| *B22F 9/04* | (2006.01) | |
| *B22F 9/20* | (2006.01) | |
| *H01M 4/139* | (2010.01) | |
| *H01M 4/04* | (2006.01) | |
| *H01M 4/88* | (2006.01) | |
| *B22F 1/00* | (2006.01) | |

(52) U.S. Cl.
CPC .............. *C25B 1/04* (2013.01); *B22F 1/0018* (2013.01); *B22F 2009/043* (2013.01); *B22F 2301/25* (2013.01); *B22F 2304/054* (2013.01); *B22F 2999/00* (2013.01); *H01M 4/0404* (2013.01); *H01M 4/139* (2013.01); *H01M 4/88* (2013.01); *Y02E 60/366* (2013.01)

(58) Field of Classification Search
USPC ........................................................ 427/115
See application file for complete search history.

(56) References Cited

U.S. PATENT DOCUMENTS

| | | | |
|---|---|---|---|
| 6,645,444 B2 * | 11/2003 | Goldstein ............ | B01J 31/1805 423/1 |
| 7,041,350 B1 | 5/2006 | Rule et al. | |
| 7,785,392 B2 | 8/2010 | Shim et al. | |
| 8,192,866 B2 | 6/2012 | Golightly et al. | |
| 8,395,003 B2 | 1/2013 | Leger et al. | |
| 8,372,177 B1 | 2/2013 | Thoma et al. | |
| 9,281,518 B2 * | 3/2016 | Singh .................... | H01M 4/366 |
| 9,296,043 B2 * | 3/2016 | Rowe ......................... | B22F 9/16 |
| 2005/0217427 A1 | 10/2005 | Suthersan et al. | |
| 2006/0177660 A1 | 8/2006 | Kumar et al. | |
| 2009/0011297 A1 | 1/2009 | Jang et al. | |
| 2009/0029148 A1 | 1/2009 | Hashimoto et al. | |
| 2009/0090214 A1 | 4/2009 | Cheng | |
| 2009/0093553 A1 | 4/2009 | Kleine et al. | |
| 2009/0264277 A1 | 10/2009 | Rishi et al. | |
| 2010/0021799 A1 | 1/2010 | Rieke | |
| 2011/0200848 A1 | 8/2011 | Chiang et al. | |
| 2011/0223480 A1 | 9/2011 | Wee et al. | |
| 2011/0274989 A1 * | 11/2011 | Lu .......................... | H01M 4/90 429/405 |
| 2012/0094178 A1 | 4/2012 | Loveridge et al. | |
| 2013/0029920 A1 * | 1/2013 | Brimble ................. | B01J 37/031 514/21.4 |
| 2013/0084502 A1 | 4/2013 | Singh et al. | |
| 2013/0133483 A1 | 5/2013 | Yang et al. | |
| 2013/0178357 A1 | 7/2013 | Adzic et al. | |
| 2013/0224603 A1 | 8/2013 | Chen et al. | |
| 2015/0068646 A1 | 3/2015 | Rowe | |
| 2015/0096887 A1 * | 4/2015 | McDonald ................ | B22F 9/24 204/292 |
| 2015/0099118 A1 | 4/2015 | Mizuno et al. | |
| 2015/0099135 A1 | 4/2015 | Mohtadi et al. | |
| 2015/0099172 A1 | 4/2015 | Rowe et al. | |
| 2015/0099182 A1 | 4/2015 | Singh et al. | |
| 2015/0099183 A1 | 4/2015 | Singh et al. | |

FOREIGN PATENT DOCUMENTS

| | | |
|---|---|---|
| JP | 2013-131366 A | 7/2013 |
| WO | WO2012007830 A1 | 1/2012 |
| WO | WO2013063161 A2 | 5/2013 |

OTHER PUBLICATIONS

Imamura et al., "Dehydriding of Sn/MgH2 nanocomposite formed by ball milling of MgH2 with Sn", International Journal of Hydrogen Energy, Jul. 2007, pp. 4191-4194, vol. 32.

Lu et al., "Lithium-oxygen batteries: bridging mechanistic understanding and battery performance", Energy Environmental Science, 2013, pp. 750-768, vol. 6.

McCloskey et al., "Chemical and Electrochemical Differences in Nonaqueous Li—O2 and Na—O2 Batteries", Journal of Physical Chemistry Letters, 2014, pp. 1230-1235, vol. 5.

Peng et al., "A Reversible and Higher-Rate Li—O2 Battery", Science, Aug. 2012, pp. 563-566, vol. 337.

Rowe et al., "Ligated Anionic-Element Reagent Complexes (LAERCs) as Novel Reagents", U.S. Appl. No. 14/593,371, filed Jan. 9, 2015, 13 pages.

Rowe et al., "Synthesis of Ferromagnetic Manganese-Bismuth Nanoparticles Using a Manganese-Based Ligated Anionic-Element Reagent Complex (Mn-LAERC) and Formation of Mulk MnBi Magnets Therefrom", U.S. Appl. No. 14/593,583, filed Jan. 9, 2015, 14 pages.

Schüth et al., "Light Metal Hydrides and Complex Hydrides for Hydrogen Storage", Chem. Commun., Sep. 2004, pp. 2249-2258, Issue 20.

Shen et al., "An iridium nanoparticles dispersed carbon based thick film electrochemical biosensor and its application for a single use, disposable glucose biosensor", Sensors and Actuators B Chemical, 2007, pp. 106-113, vol. 125, No. 1.

Shim et al., "Oxidation-state dependent electrocatalytic activity of iridium nanoparticals supported on graphene nanosheets", Physical Chemistry Chemical Physics, 2013, 15, pp. 15365-15370.

Singh et al., "A high energy-density tin anode for rechargeable magnesium-ion batieries", Chem. Commun., 2013, Nov. 8, 2012, pp. 149-151, vol. 49.

Singh et al., "Electronic Supplementary Material (Esi): A High Energy-Density Tin Anode for Rechargeable Magnesium-Ion Batteries", Electronic Supplementary Material (ESI) for Chemical Communications, Nov. 8, 2012, 4 pages.

Thotiyl et al., "A stable cathode for the aprotic Li—O2 battery", Nature Materials, Nov. 2013, vol. 12, pp. 1050-1056.

Valvo et al, "Electrospraying-assisted synthesis of tin nanoparticles for Li-ion battery electrodes", Journal of Power Sources, 2009, pp. 297-302, vol. 189.

Wang et al., "Tin Nanoparticle Loaded Graphite Andoes for Li-Ion Battery Applications", Journal of the Electrochemical Society, Oct. 2004, pp. A1804-A1809, vol. 151, No. 11.

Zou et al, "Size-dependent melting properties of Sn nanoparticles by chemical reduction synthesis", Trans. Nonferrous Met. Soc. China, 2010, pp. 248-253, vol. 20.

Peng, B. et al., "Functional materials with high-efficiency energy storage and conversion for batteries and fuel cells," Coordination Chemistry Reviews, 253, pp. 2805-2813 (2009).

Sanyal, U. et al., "Bimetallic core-shell nanocomposites using weak reducing agent and their transformation to alloy nanostructures," Dalton Trans., 42, pp. 7147-7157 (2013).

Bhattacharya, V. et al., "Melting of multiphase nano-scaled particles embedded in Al matrix: Case of Pb—Sn and Bi—Sn alloys," Materials Science Engineering A 449-451, pp. 1003-1008 (2007).

\* cited by examiner

ELECTRODES CONTAINING IRIDIUM NANOPARTICLES FOR THE ELECTROLYTIC PRODUCTION OF OXYGEN FROM WATER

CROSS-REFERENCE TO RELATED APPLICATIONS

This application is a continuation of U.S. patent application Ser. No. 14/328,635, filed Jul. 10, 2014, which is a continuation-in-part of each of: U.S. patent application Ser. No. 14/046,120, filed Oct. 4, 2013, now U.S. Pat. No. 9,296,043; and U.S. patent application Ser. No. 14/219,836, filed Mar. 19, 2014, now U.S. Pat. No. 9,761,904. Each of the above-referenced documents is herein incorporated by reference in its entirety.

TECHNICAL FIELD

The present invention relates in general to iridium nanoparticles synthesized by a novel route and their use as catalysts of electrochemical water splitting.

BACKGROUND

Electrochemical oxidation/reduction of water, or "water splitting"—conversion of $H_2O$ to $H_2$ and $O_2$ by application of electrical potential across electrodes of a cell—can in theory be a useful approach to produce hydrogen and oxygen fuels. As a practical matter, such an approach is severely limited by the fact that energy input generally exceeds the energy obtainable from the produced fuels. Electrode materials which increase the quantity of product at a given voltage can potentially overcome this challenge.

Iridium metal and/or oxide have been used as an electrode active material for the electrolytic production of oxygen gas from water. The efficiency of such an electrode can be improved through the use of nanoparticulate iridium. Nanoparticulate iridium of high quality is difficult and expensive to obtain in production scale quantity.

SUMMARY

Electrodes and iridium nanoparticles synthesized by a novel route are provided.

In an embodiment, an electrode comprising iridium nanoparticles is disclosed, wherein the iridium nanoparticles are synthesized by a method comprising adding surfactant to a reagent complex according to Formula I:

$$Ir^0 \cdot Xy \qquad \qquad I,$$

wherein $Ir^0$ is zero-valent iridium, X is a hydride, and y is an integral or fractional value greater than zero. The electrode which contains iridium nanoparticles synthesized by this method has excellent ability to electrolytically produce oxygen from water.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1:
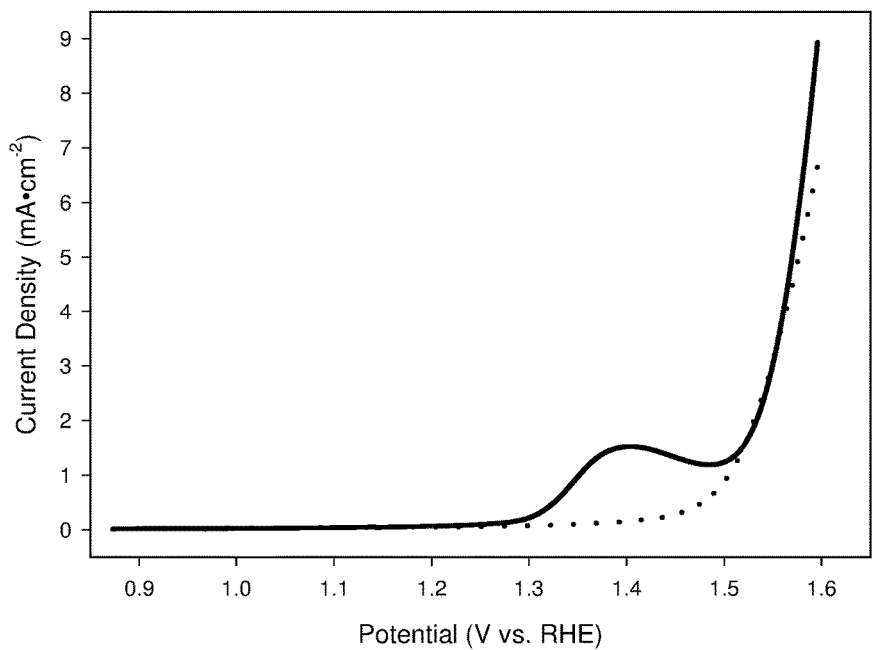
FIG. 1 is first cycle voltammograms of electrochemical cells having iridium-containing electrodes where the iridium is either directly from a commercial source or is nanoparticulate iridium synthesized by a disclosed method.

The present disclosure describes iridium nanoparticles suitable for use as active material in an electrode of an electrochemical cell. The disclosure also describes the electrodes which include such nanoparticles. The iridium nanoparticles are synthesized by a mechanochemical method which is facile, easily scalable to industrial needs, and produces pure iridium nanoparticles free of contaminants to the low nanometer (nm) scale.

The iridium nanoparticles and electrodes of the present disclosure can be useful in the electrochemical production of oxygen gas from water.

A reagent complex for the synthesis of metallic iridium nanoparticles is described by Formula I:

$$Ir^0 \cdot Xy \qquad \qquad I,$$

wherein $Ir^0$ is zero-valent iridium metal and X is a hydride. The subscript y can be any positive fractional or integral value. In some cases, y can be a value from 1 to 4, inclusive. In some cases, y can be a value from 1 to 2, inclusive. In some cases, y will be approximately 2.

The hydride employed in Formula I can be a solid metal hydride (e.g. NaH, or $IrH_2$), metalloid hydride (e.g. $BH_3$), complex metal hydride (e.g. $LiAlH_4$), or salt metalloid hydride also referred to as a salt hydride (e.g. $LiBH_4$). In some examples the hydride will be $LiBH_4$, yielding a reagent complex having the formula $Ir \cdot LiBH_4$. In some specific examples, the reagent complex will have the formula $Ir \cdot (LiBH_4)_2$. It is to be appreciated that the term hydride as used herein can also encompass a corresponding deuteride or tritide.

The reagent complex can be a complex of individual molecular entities, such as a single metal atom in oxidation state zero in complex with one or more hydride molecules. Alternatively the complex described by Formula I can exist as a molecular cluster, such as a cluster of metal atoms in oxidation state zero interspersed with hydride molecules, or a cluster of metal atoms in oxidation state zero, the cluster surface-coated with hydride molecules or the salt hydride interspersed throughout the cluster.

One process by which a reagent complex according to Formula I can be obtained includes a step of ball-milling a mixture which includes both a hydride and a preparation composed of iridium. The preparation composed of iridium can be derived from any source of metallic iridium, but will typically be a source of metallic iridium that contains zero-valent iridium at greater than 50% purity and at a high surface-area-to-mass ratio. For example, a suitable preparation composed of iridium would be an iridium powder comparable to commercial grade iridium powder.

The ball-milling step can be performed with any type of ball mill, such as a planetary ball mill, and with any type of ball-milling media, such as stainless steel beads. It will typically be preferable to perform the ball-milling step in an inert environment, such as in a glove box under vacuum or under argon.

The reagent complex described above and by Formula I can be used in a method for synthesizing iridium nanoparticles. The method for synthesizing iridium nanoparticles includes the step of adding surfactant to a reagent complex according to Formula I, the reagent complex being in all particulars as described above. In some examples of the method for synthesizing iridium nanoparticles, the reagent complex can be in suspended contact with a solvent or solvent system. Suitable solvents in which the reagent complex can be suspended during addition of surfactant will typically be solvents in which the suspended reagent complex is stable for at least an hour. In some examples, such suitable solvents can include ethereal solvents or aprotic solvents. In some particular examples, such a suitable solvent will be THF. In some instances, it may be preferred to perform the method for synthesizing iridium nanoparticles in an inert environment, such as in a glove-box under vacuum or argon.

In some variations of the method for synthesizing iridium nanoparticles, the surfactant can be in suspended or solvated contact with a solvent or solvent system. In different variations wherein the reagent complex is in suspended contact with a solvent or solvent system and the surfactant is suspended or dissolved in a solvent or solvent system, the reagent complex can be in suspended contact with a solvent or solvent system of the same or different composition as compared to the solvent or solvent system in which the surfactant is dissolved or suspended.

In some variations of the method for synthesizing iridium nanoparticles, the reagent complex can be combined with surfactant in the absence of solvent. In some such cases a solvent or solvent system can be added subsequent to such combination. In other aspects, surfactant which is not suspended or dissolved in a solvent or solvent system can be added to a reagent complex which itself is in suspended contact with a solvent or solvent system. In yet other aspects, surfactant which is suspended or dissolved in a solvent or solvent system can be added to a reagent complex which is not in suspended contact with a solvent or solvent system.

The surfactant utilized in the method for synthesizing iridium nanoparticles can be any known in the art. Usable surfactants can include nonionic, cationic, anionic, amphoteric, zwitterionic, and polymeric surfactants and combinations thereof. Such surfactants typically have a lipophilic moiety that is hydrocarbon based, organosilane based, or fluorocarbon based. Without implying limitation, examples of types of surfactants which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, alkyl amines, nitriles, quaternary ammonium salts, carboxybetaines, sulfobetaines, or polymeric surfactants.

In some instances the surfactant employed in the method for synthesizing iridium nanoparticles will be one capable of oxidizing, protonating, or otherwise covalently modifying the hydride incorporated in the reagent complex. In some variations the surfactant can be a carboxylate, nitrile, or amine. In some examples the surfactant can be octylamine.

Also disclosed is an electrode suitable for use in an electrochemical cell. The electrode includes as active material iridium nanoparticles. The iridium nanoparticles included in the electrode have an average maximum dimension less than 100 nm. In some instances, the iridium nanoparticles included in the electrode have an average maximum dimension of 10 nm or less. In some instances, the iridium nanoparticles included in the electrode have an average maximum dimension of 5 nm or less. The iridium nanoparticles included in the electrode are, in some variations, generally of uniform size. The iridium nanoparticles included in the electrode can be obtained by the process for synthesizing iridium nanoparticles, as disclosed above.

In some instances, an electrode of the present disclosure can, when deployed in an appropriately configured electrochemical cell, catalyze the half-cell reaction:

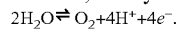

In some such instances, as illustrated below, the disclosed electrode will catalyze the half-cell reaction with greater efficiency than does an otherwise identical electrode having iridium from a different source.

It will be appreciated that the disclosed electrode can, include additional structural substrates, binding agents, and/or other active materials. In a non-limiting example, a co-suspension in THF of iridium nanoparticles synthesized by the disclosed method, acid-treated carbon black, and fluorinated sulfonic acid polymer were sonicated and cast on a glassy carbon electrode. For comparison purposes, an otherwise identical electrode was prepared in which iridium nanoparticles synthesized by the disclosed method were replaced with commercially obtained iridium powder.

Figure 2:
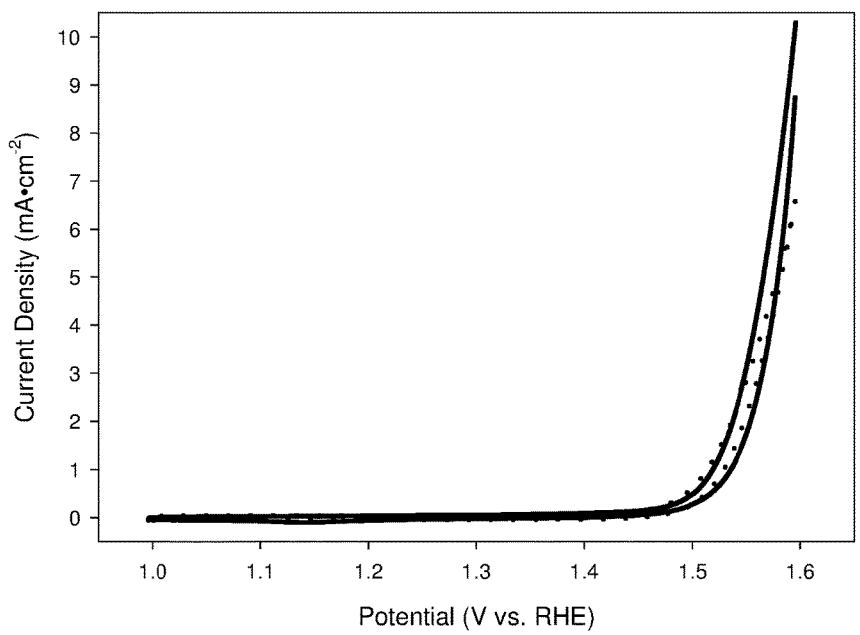
FIG. 2 is second cycle voltammograms of the electrochemical cells of FIG. 1.
Figure 3:
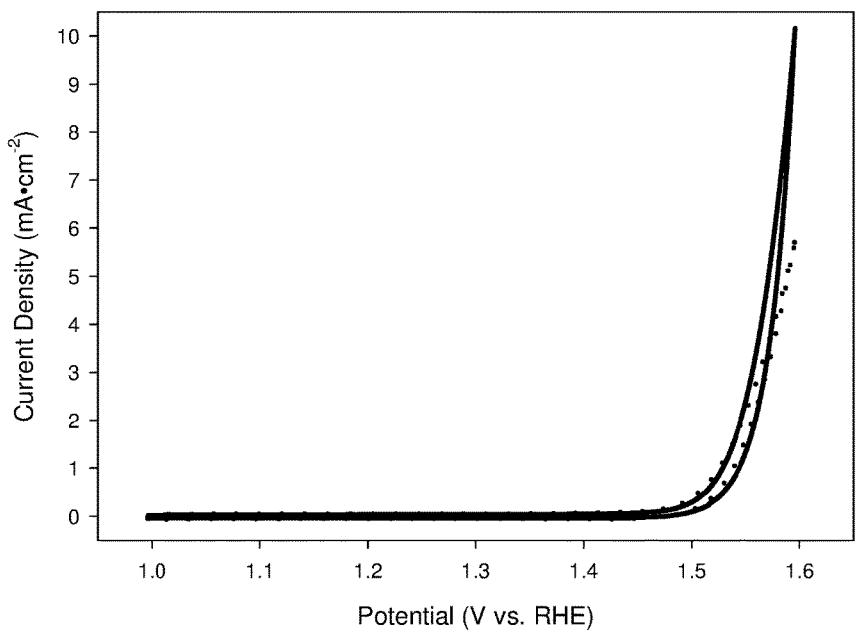
FIG. 3 is tenth cycle voltammograms of the electrochemical cells of FIG. 1.

Each of the two electrode types, disclosed and comparative, was deployed in an electrochemical cell opposite a platinum electrode and with oxygenated sulfuric acid electrolyte. Each of the cell types was subjected to voltammetric analysis, as shown in FIGS. 1-3. FIGS. 1, 2, and 3 show first cycle, second cycle, and tenth cycle voltammetric curves, respectively. In each case, the solid line represents data for the electrochemical cell having the disclosed electrode with iridium nanoparticles synthesized by the disclosed method. The dotted line represents data for the electrochemical cell having the comparative electrode with commercially obtained iridium powder.

Comparison of FIGS. 1-3 indicates that the disclosed electrode is highly consistent over multiple cycles, generating similar current density across all voltages in cycle ten as compared to cycle one. Of significance, each of FIGS. 1-3 shows that the disclosed electrode has superior electrochemical performance relative to the comparative electrode. At operative potentials, the electrode having iridium nanoparticles synthesized by the disclosed method generates greater current density, and hence greater quantity of oxygen, than does the electrode having commercially obtained iridium.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1. Iridium Nanoparticle Synthesis

To a stainless steel ball mill jar is added 2.0 g of iridium powder (−325 mesh) and 0.453 g lithium borohydride powder. Stainless steel balls are added to the jar as well. The mixture is subjected to 250 rpm for 4 hours, under argon, in a planetary ball mill. 0.750 g of the resulting Ir(LiBH$_4$)$_2$ powder is then added to 10 mL THF, along with 4.110 g octylamine. This mixture is stirred, under argon, for 4 hours. The nanoparticle product is then collected and the reaction solution decanted away. The isolated nanoparticle powder is washed with ethanol, then ethanol/water, and finally acetone before being dried.

Example 2. Iridium Electrode Preparation

Iridium electrodes were prepared by drop casting a catalyst ink onto a glassy carbon electrode. The catalyst ink was first prepared by sonicating a mixture of catalyst, acid-treated carbon black (CB, Alfa Aesar), Na⁺-exchanged Nafion® solution (5 wt %, Ion Power) with tetrahydrofuran (THF, Sigma-Aldrich). After drop casting, the catalyst film was allowed to dry at room temperature overnight and the final composition of the film was expected to be 100, 20, and 20 µg/cm² for Iridium nanoparticles, CB, and Nafion®, respectively.

Example 3. Iridium Electrode Testing

Electrochemistry was used to determine the catalytic ability of the catalyst. Cyclic voltammetry experiments were performed in 1M $H_2SO_4$ electrolyte that was saturated with $O_2$. Scans were cycles between 1V vs. RHE (reversible hydrogen electrode) and 1.6 V vs. RHE a total of 10 times at 10 mV/s. The catalysts-containing working electrode was rotated at 1600 rpm. Counter electrode used in the cell was a platinum wire separated from the cell using a glass frit. All potentials were measured versus a Ag/AgCl electrode but the potentials were converted to RHE for ease of understanding.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for preparing an electrode comprising iridium nanoparticles, the method comprising:
   synthesizing iridium nanoparticles by adding surfactant to a reagent complex having a formula, $Ir^0 \cdot X_y$, wherein $Ir^0$ is iridium, formally in oxidation state zero, X is a hydride molecule, and y is an integral or fractional value greater than zero, and wherein the iridium is in oxidation state zero prior to addition of surfactant to the reagent complex, such that surfactant quenches the hydride molecule; and
   preparing an electrode using the iridium nanoparticles.

2. The method as recited in claim 1, comprising:
   ball milling a mixture that includes a powder of the hydride molecule and an iridium powder to produce the reagent complex.

3. The method as recited in claim 1, wherein the hydride molecule is a borohydride.

4. The method as recited in claim 1, wherein the hydride molecule is lithium borohydride.

5. The method as recited in claim 1, wherein adding surfactant to the reagent complex produces iridium nanoparticles having an average maximum dimension less than about 100 nm.

6. The method as recited in claim 1, wherein adding surfactant to the reagent complex produces iridium nanoparticles having an average maximum dimension less than about 10 nm.

7. The method as recited in claim 1, wherein adding surfactant to the reagent complex produces iridium nanoparticles having an average maximum dimension less than about 5 nm.

8. The method as recited in claim 1, wherein preparing the electrode using the iridium nanoparticles comprises:
   mixing the iridium nanoparticles with a binder, a conductive powder, and a solvent to produce a catalyst ink; and
   drop casting the catalyst ink on a current collector.

9. A method for preparing an electrode comprising iridium nanoparticles, the method comprising:
   ball milling a substantially solvent-free mixture that includes a hydride molecule and a preparation composed of iridium to produce a reagent complex a reagent complex having a formula, $Ir^0 \cdot X_y$, wherein $Ir^0$ is iridium, formally in oxidation state zero, X is a hydride molecule, and y is an integral or fractional value greater than zero, and wherein the iridium is in oxidation state zero prior to addition of surfactant to the reagent complex, such that surfactant quenches the hydride molecule
   synthesizing iridium nanoparticles by adding surfactant to the reagent complex; and
   preparing an electrode using the iridium nanoparticles.

* * * * *